(12) United States Patent
Jia et al.

(10) Patent No.: US 11,582,706 B2
(45) Date of Patent: Feb. 14, 2023

(54) DETERMINE ABNORMAL CLOCK

(71) Applicant: Hewlett Packard Enterprise Development LP, Houston, TX (US)

(72) Inventors: Xuguang Jia, Beijing (CN); Qiang Zhou, Beijing (CN); Jianpo Han, Beijing (CN); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 598 days.

(21) Appl. No.: 16/262,292

(22) Filed: Jan. 30, 2019

(65) Prior Publication Data

US 2019/0239173 A1    Aug. 1, 2019

(51) Int. Cl.
*H04W 56/00*    (2009.01)
*H04W 84/12*    (2009.01)

(52) U.S. Cl.
CPC ..... *H04W 56/001* (2013.01); *H04W 56/0015* (2013.01); *H04W 84/12* (2013.01)

(58) Field of Classification Search
CPC ........... H04W 56/001; H04W 56/0015; H04W 84/12
See application file for complete search history.

(56) References Cited

U.S. PATENT DOCUMENTS

| 9,179,495 B1 | 11/2015 | Scherzer et al. |
| 9,360,885 B2 | 6/2016 | Ilyas et al. |
| 9,515,756 B2 | 12/2016 | Khoury et al. |
| 2011/0281571 A1* | 11/2011 | Patel ............... H04W 56/0015 455/418 |
| 2015/0139199 A1* | 5/2015 | Pfeifer ............ H04W 56/0015 370/336 |
| 2015/0249967 A1 | 9/2015 | Kafle et al. |
| 2017/0070337 A1 | 3/2017 | Giriyappa et al. |
| 2017/0208558 A1* | 7/2017 | Gao ................ H04W 56/0015 |
| 2017/0257836 A1 | 9/2017 | Ho et al. |
| 2018/0176874 A1* | 6/2018 | Wang .................. H04W 56/004 |

FOREIGN PATENT DOCUMENTS

| CN | 102857315 A | 1/2013 |
| CN | 104113386 A | 10/2014 |
| CN | 105933184 | 9/2016 |
| CN | 106559157 A | 4/2017 |
| EP | 3322232 A1 | 5/2018 |
| KR | 20160040042 A * | 4/2016 |
| WO | WO-2011063047 | 5/2011 |
| WO | 2013/108392 A1 | 7/2013 |
| WO | WO-2017028043 | 2/2017 |

OTHER PUBLICATIONS

European Search Report and Search Opinion Received for EP Application No. 18174185.1, dated Nov. 20, 2018, 7 pages.
ONOS Controller Performance Test Report, (Research Paper), Jul. 4, 2016, 18 Pgs.

* cited by examiner

*Primary Examiner* — Ricky Q Ngo
*Assistant Examiner* — Stephen N Steiner
(74) *Attorney, Agent, or Firm* — Hewlett Packard Enterprise Patent Department

(57) ABSTRACT

An example device comprising: a processor to detect a time difference between a first system clock of an access point (AP) and a second system clock of a controller; determine whether the AP has abnormal dock based on the time difference; and automatically recover the first system clock of the AP when the AP has abnormal clock.

12 Claims, 4 Drawing Sheets

DETERMINE ABNORMAL CLOCK

BACKGROUND

When a device's hardware clock runs slower or faster caused by some reason, the device may have an abnormal clock. For abnormal dock, one example is slow time. When hardware clock runs slower, a system on a chip (SOC) based system may meet a serious situation. In this situation, operating system (OS) clock may become slower and timer based functions may not perform as except in some cases.

DETAILED DESCRIPTION

Figure 1:
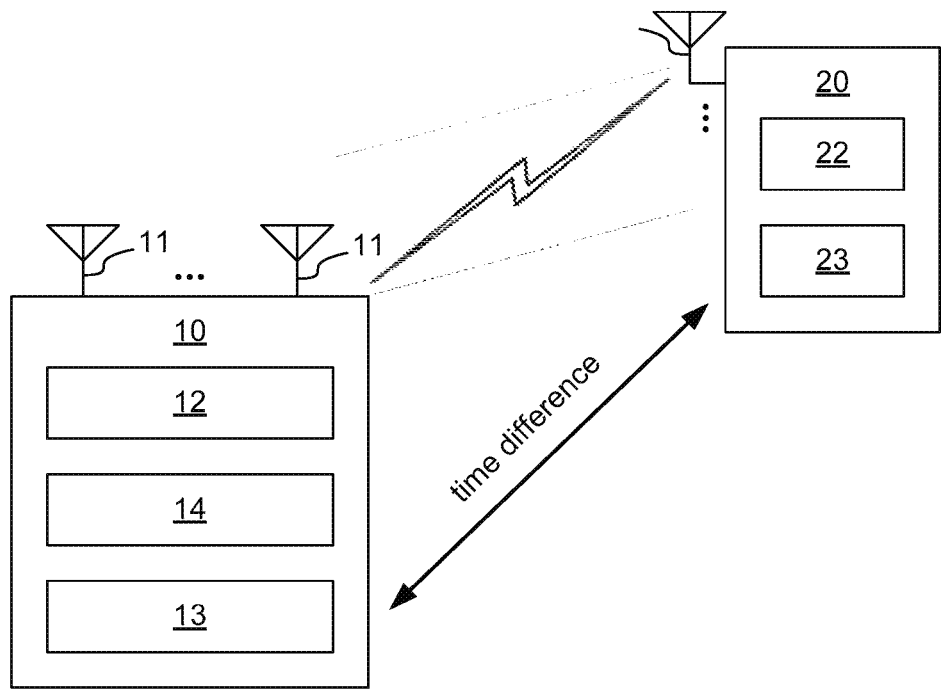
FIG. 1 is a block diagram illustrating an example WLAN including a wireless device capable of automatically determining abnormal clock according to the present disclosure.

In wireless system, Network Time Protocol (NTP) can help to synchronize time from NTP server. But, wireless access points (AP) may have no NTP service.

When an AP encounters an abnormal clock, for example, the AP device appears 2.5 times slow, that is, the system clock of the AP device is 2.5 times slower than a system dock of a controller. As a result, transmissions of packets as well as beacon management frames might fail, which may then cause client devices unable to connect to the AP's Basic Service Set (BSS), or have low throughput experience. The controller managing the AP would have not be aware about the abnormal clock with the AP.

For this kind of abnormal clock, a user may need to manually detect whether the AP has an abnormal clock, and then locate and recover the AP manually, which is inconvenient for in-field deployment.

Accordingly, in the examples herein, a time difference $T_{diff}$ between an AP and a controller can be detected or estimated based on the system time of the AP and the controller. For example, the time difference $T_{diff}$ may be detected or estimated by any two adjacent time synchronize procedures between the AP and the controller.

According to the time difference $T_{diff}$ in the examples herein, the AP can determine whether there is an abnormal clock. For example, if the $T_{diff}$ is less than a pre-determined time difference threshold, the AP may not have an abnormal clock. If the $T_{diff}$ is greater than or equal to the pre-determined time difference threshold, the AP may have abnormal dock, that is, the system dock of the AP may run slower or faster than the system clock of the controller.

When the AP has abnormal dock, in the examples herein, the system clock of AP will be recovered automatically. Further, the AP may also choose to report the abnormal dock to the controller.

In one example, a device comprising a processor to detect a time difference between a first system clock of an AP and a second system clock of a controller, to determine whether the AP has abnormal clock based on the time difference, and to automatically recover the first system dock of AP when the AP has abnormal clock. Further, the processor is to report the abnormal dock to the controller.

In another example, a method comprising calculating, by a processor of an AP, a time difference between a first system clock of the AP and a second system clock of a controller. The method comprising determining, by the processor, whether the AP has abnormal clock based on the time difference. And, the method comprising automatically recovering, by the processor, the first system clock of the AP when the AP has abnormal clock. Further, the method may comprising reporting, by the processor, the abnormal clock to the controller.

In another example, a non-transitory computer readable storage medium storing instructions that, when executed by a processor of an AP, causes the processor to detect a time difference between a first system clock of an AP and a second system clock of a controller, to determine whether the AP has abnormal clock based on the time difference, and to automatically recover the first system dock of AP when the AP has abnormal clock. Further, the non-transitory computer readable storage medium may store instructions that, when executed by the processor, causes the processor to report the abnormal clock to the controller.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for automatically determine abnormal clock. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example WLAN including a wireless device capable of automatically determining abnormal clock according to the present disclosure. Referring to FIG. 1, a WLAN includes an AP 10 and at least one controller 20.

The AP 10 includes at least one antenna 11 that may be coupled to a radio frequency (RF) transceiver 12 for transmitting the wireless transmissions to and receiving the wireless transmissions from the controller 20. The controller 20 also includes at least one antenna 21 that may be coupled to a RF transceiver 22 for transmitting the wireless transmissions to and receiving the wireless transmissions from the AP 10.

The AP 10 may include a first system clock 13 capable of providing system time of the AP 10. The controller 20 may also include a second system clock 23 capable of providing system time of the controller 20 which can be sent to RF transceiver 12 through RF transceiver 22.

The AP 10 may include a processor 14 capable of receiving the system time of the AP 10 from the first system clock 13 and receiving the system time of the controller 20 from the RF transceiver 12. The processor 14 can be a hardware component and can execute instructions of a software component.

The processor 14 may detect or estimate a time difference $T_{diff}$ between the first system clock 13 and the second system clock 23. The time difference $T_{diff}$ may be detected or estimated based on the system time of the AP 10 and the system time of the controller 20.

For example, in order to obtain the time difference $T_{diff}$, the AP may initiate continuously multiple time synchronization procedures between the AP and the controller and detect or estimate the time difference by any two adjacent time synchronize procedures. In a time synchronize procedure, the AP may send a time synchronize request message to the controller, and receive a time synchronize respond message from the controller.

For example, the AP may start the following two time synchronize procedures with controller to get the time difference $T_{diff}$:

First, before start the time synchronize procedures, the AP may setup a hardware timer to trigger time synchronize procedure. The interval value of the timer may be defined as $T_{timer}$.

Second, start the timer. When the timer timeout based on the AP's system clock, start a first time synchronize procedure:

In the first time synchronize procedure, the AP may record its current system time obtained from the first system clock 13 as $T_{AP\_01}$, and may send a first time synchronize request message to the controller, and get a last controller system time $T_{last\_controller}$ from a first time synchronize respond message sent by the controller. The last controller system time $T_{last\_controller}$ could be obtained from the second system clock 23 of the controller. The AP may make its own system time synchronize to the $T_{last\_controller}$, and may record the AP's last system time as $T_{last\_AP}$. That is, the $T_{last\_AP}$ is equal to $T_{last\_controller}$.

Third, When the timer timeout again based on the AP's system clock, start a second time synchronize procedure:

In the second time synchronize procedure, the AP may record its current system time obtained from the first system clock 13 as $T_{AP}$, and may send out a second time synchronize request message to the controller, and get a last controller system time $T_{controller}$ from a second time synchronize respond message sent by the controller. The last controller system time $T_{controller}$ could be obtained from the second system clock 23 of the controller. The AP may make its own system time synchronize to the $T_{controller}$, and may record the AP's last system time as $T_{last\_AP\_02}$. That is, the $T_{last\_AP\_02}$ is equal to $T_{controller}$.

Fourth, The AP may calculate the time difference between the AP and the controller based on the $T_{last\_AP}$, $T_{AP}$, $T_{controller}$ and $T_{controller}$.

For example, the AP time difference $T_{diff\_AP}$ may be calculated from equation (1) below.

$$T_{diff\_AP}=T_{AP}-T_{last\_AP}. \qquad \text{Equation (1)}$$

That is, the $T_{diff\_AP}$ is the difference between $T_{AP}$ and $T_{last\_AP}$, wherein the $T_{AP}$ is the current AP system time obtained from the first system clock of the AP in the second time synchronize procedure, and the $T_{last\_AP}$ is the last AP system time obtained from the second system clock of the controller in the first time synchronize procedure.

The controller time difference $T_{diff\_controller}$ may be calculated from equation (2) below.

$$T_{diff\_controller}=T_{controller}-T_{last\_controller}. \qquad \text{Equation (2)}$$

That is, the $T_{last\_controller}$ is the difference between $T_{controller}$ and $T_{last\_controller}$, wherein the $T_{controller}$ is the last controller system time obtained from the second system clock of the controller in the second time synchronize procedure, and the $T_{last\_controller}$ is the last controller system time obtained from the second system clock of the controller in the first time synchronize procedure.

Then, the time difference $T_{diff}$ between the AP and the controller may be calculated from equation (3) below.

$$T_{diff}=|T_{diff\_AP}-T_{diff\_controller}|. \qquad \text{Equation (3)}$$

That is, the $T_{diff}$ is the absolute value of the difference between $T_{diff\_AP}$ and $T_{diff\_controller}$.

Figure 2:
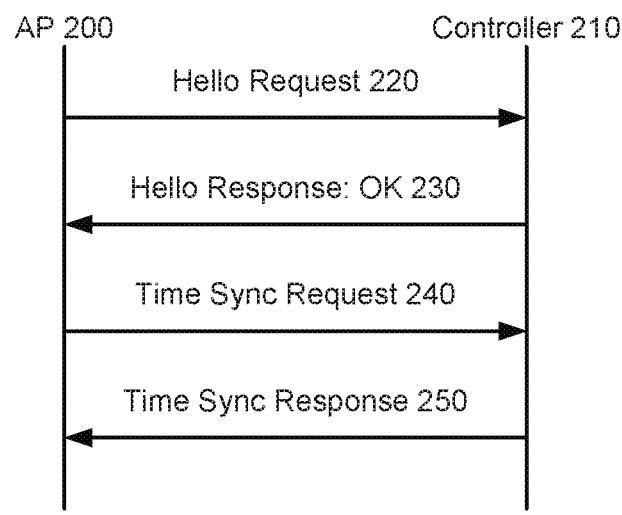
FIG. 2 is a diagram illustrating an example time synchronize procedure according to present disclosure.

FIG. 2 is a diagram illustrating an example time synchronize procedure according to present disclosure. Referring to FIG. 2, before sending a Time Synchronize Request message, the AP 200 may send a Hello Request message 220 to the controller 210. The Hello Request message 220 may be used for AP 200 identification and make sure link is ready. If the controller 210 returns a Hello Response: OK message 230 corresponding to the Hello Request message 220, then the AP 200 may start the time synchronize procedure by sending a Time Synchronize Request message 240 to the controller 210. The controller 210 may send a Time Synchronize Response message 250 corresponding to the Time Synchronize Request message 240 to the AP 200. The current controller's system time could be contained in the Time Synchronize Response message 250, and the controller 210 may always own the correct system time.

The processor 14 may determine whether the AP has abnormal clock based on the time difference.

For example, if the AP may not have abnormal clock, then the $T_{diff}$ may be less than a pre-determined threshold, e.g. approximately equal to zero. If the AP may have abnormal clock, then the system clock of the AP could be slower or faster than the system clock of the controller. For example, If the system clock of the AP run slower than the system clock of the controller, then $T_{diff\_AP}<T_{diff\_controller}$; If the system dock of the AP run faster than the system clock of the controller, then $T_{diff\_AP}>T_{diff\_controller}$.

For example, when a time difference threshold $T_{diff\_thres}$ and an event count threshold N are defined, whether the AP has abnormal clock based on the time difference may be determined as follows:

In each time synchronize procedure, do the following check:

If $T_{diff} < T_{diff\_thres}$, $I_{count}=0$; that is, if the $T_{diff}$ is less than the $T_{diff\_thres}$, the current value of the event count $I_{count}$ is zero; else, $I_{count}=I_{count}+1$; that is, the current value of the event count $I_{count}$ is increased by one; if $I_{count} \geq N$, that is, if the current value of the event count $I_{count}$ is greater than or equal to the event count threshold N, then the AP may have abnormal clock; else, the AP may not have abnormal dock.

The pre-determined time difference threshold $T_{diff\_thres}$ and event count threshold N may be obtained from experiences according to the deployment or estimated from some mathematic models.

The processor 14 may automatically recover the first system clock of the AP by rebooting the AP when the AP has abnormal dock. Further, the processor 14 may report the abnormal dock to the controller.

Figure 3:
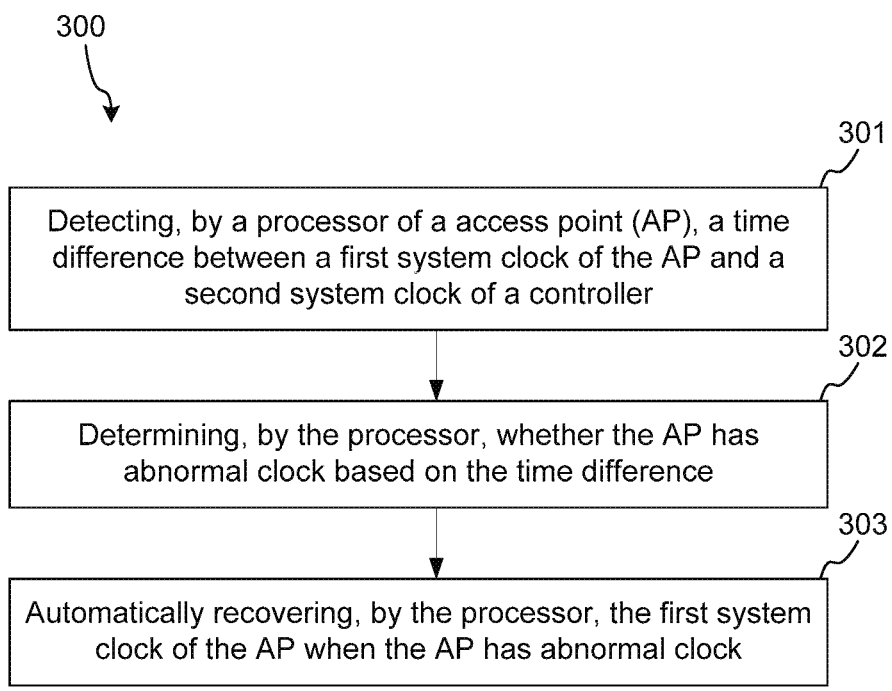
FIG. 3 is a flow chart illustrating an example method for automatically determining abnormal clock according to present disclosure.

FIG. 3 is a flow chart illustrating an example method for automatically determining abnormal clock according to present disclosure.

Referring to FIG. 3: The method 300 comprises detecting, by a processor of an AP, a time difference between a first system clock of the AP and a second system clock of a controller, at 301. In one example, the time difference may be detected or estimated based on the system time of the AP and the system time of the controller. In another example, the time difference may be detected or estimated by every two time synchronize procedure between the AP and the controller.

The method 300 comprises determining, by the processor, whether the AP has abnormal clock based on the time difference, at 302. In one example, if the $T_{diff}$ is less than a pre-determined time difference threshold, the AP may not have abnormal clock. If the absolute value of the $T_{diff}$ is greater than or equal to the pre-determined time difference threshold, the AP may have abnormal dock.

The method 300 comprises automatically recovering, by the processor, the first system clock of the AP when the AP has abnormal clock, at 303. In one example, the system clock of AP will be recovered by rebooting the AP.

Figure 4:
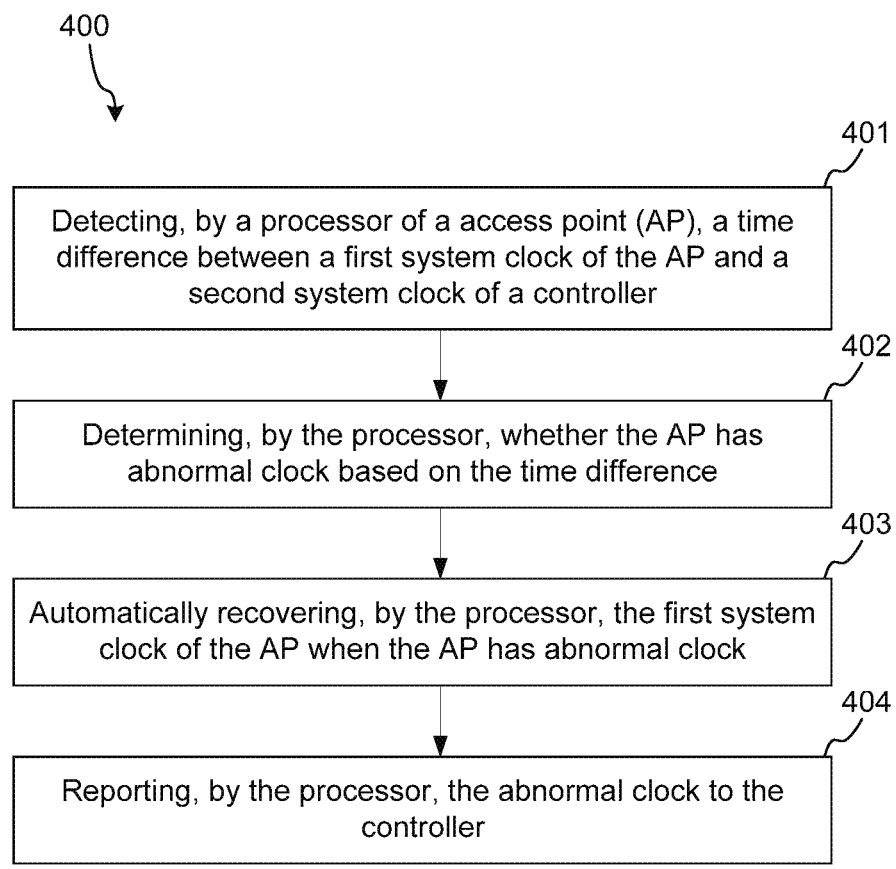
FIG. 4 is a flow chart illustrating an example method for automatically determining abnormal clock according to present disclosure.

FIG. 4 is a flow chart illustrating an example method for automatically determining abnormal clock according to present disclosure.

Referring to FIG. 4: The method 400 comprises detecting, by a processor of an AP, a time difference between a first system clock of the AP and a second system clock of a controller, at 401. Similarly to the method 300, the time difference may be detected or estimated based on the system time of the AP and the system time of the controller. In another example, the time difference may be detected or estimated by every two time synchronize procedure between the AP and the controller.

The method 400 comprises determining, by the processor, whether the AP has abnormal clock based on the time difference, at 402. Similarly to the method 300, if the $T_{diff}$ is less than a pre-determined time difference threshold, the AP may not have abnormal clock. If the absolute value of the $T_{diff}$ is greater than or equal to the pre-determined time difference threshold, the AP may have abnormal clock.

The method 400 comprises automatically recovering, by the processor, the first system clock of the AP when the AP has abnormal clock, at 403. Similarly to the method 300, the system clock of AP will be recovered by rebooting the AP.

The method 400 comprises automatically reporting, by the processor, the abnormal clock to the controller, at 404.

Figure 5:
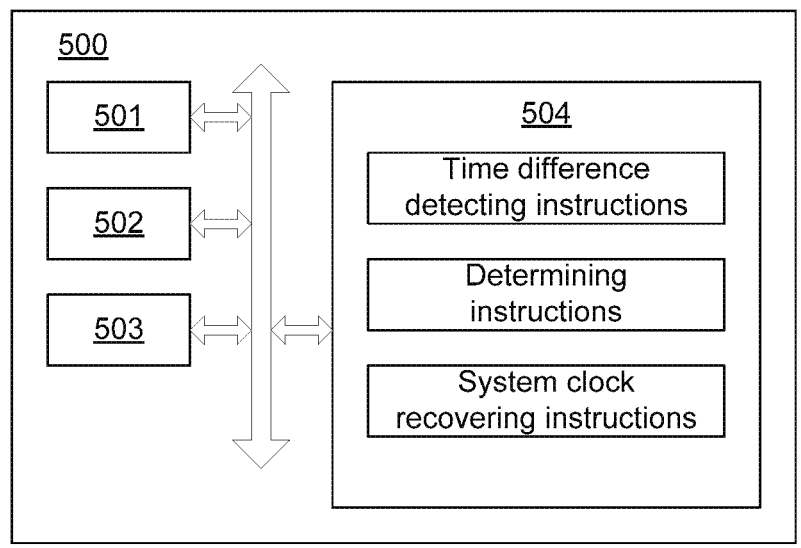
FIG. 5 is a block diagram illustrating example device shown in FIG. 1 according to present disclosure.

FIG. 5 is a block diagram illustrating example device shown in FIG. 1 according to present disclosure. Referring to FIG. 5, the device 500 is suitable to implement a device such as the AP 10, and includes a RF transceiver 501, a processor 502, a system clock 503 and a non-transitory computer readable storage medium 504.

The RF transceiver 501 transmits the wireless transmissions and receives the wireless transmissions.

The non-transitory computer readable storage medium 504 stores instructions excitable for the possessor 502.

The instructions include time difference detecting instructions that, when executed by the processor 502, cause the processor 502 to detect a time difference between the system clock 503 and a system clock of a controller.

The instructions include determining instructions that, when executed by the processor 502, cause the processor 502 to determine whether the AP has abnormal clock based on the time difference.

The instructions include system clock recovering instructions that, when executed by the processor 502, cause the processor 502 to automatically recover the system clock 503 when the AP has abnormal clock.

Figure 6:
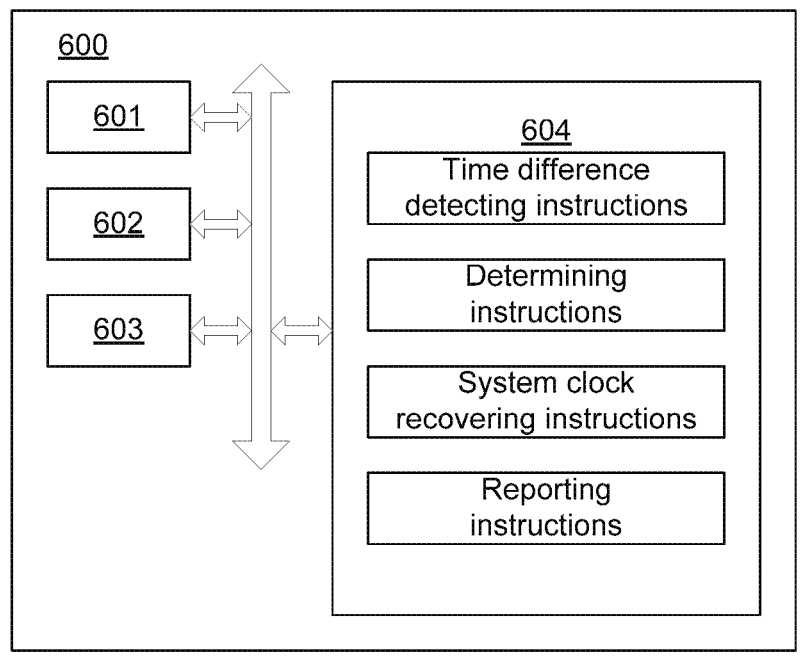
FIG. 6 is a block diagram illustrating example device shown in FIG. 1 according to present disclosure.

FIG. 6 is a block diagram illustrating example device shown in FIG. 1 according to present disclosure. Referring to FIG. 6, the device 600 is suitable to implement a device such as the AP 10, and includes a RF transceiver 601, a processor 602, a system clock 603 and a non-transitory computer readable storage medium 604.

The RF transceiver 601 transmits the wireless transmissions and receives the wireless transmissions.

The non-transitory computer readable storage medium 604 stores instructions excitable for the possessor 602.

The instructions include time difference detecting instructions that, when executed by the processor 602, cause the processor 602 to detect a time difference between the system clock 603 and a system clock of a controller.

The instructions include determining instructions that, when executed by the processor 602, cause the processor 602 to determine whether the AP has abnormal clock based on the time difference.

The instructions include system clock recovering instructions that, when executed by the processor 602, cause the processor 602 to automatically recover the system clock 603 when the AP has abnormal clock.

The instructions include reporting instructions that, when executed by the processor 602, cause the processor 602 to report the abnormal clock to the controller.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A device comprising:
    at least one processor; and
    a memory storing instructions that, when executed by the at least one processor, cause the device to:
        detect a time difference between a first system clock of an access point (AP) and a second system clock of a controller;
        determine that the first system clock of the AP is abnormal when the time difference is greater than or equal to a pre-determined time difference threshold; and
        in response to determining that the first system clock of the AP is abnormal, recover the first system clock of the AP by rebooting the AP, wherein the time difference between the first system clock of the AP and the second system clock of the controller is an absolute value of a difference between $T_{diff\_AP}$ and $T_{diff\_controller}$, wherein:

$T_{diff\_AP}$ is a difference between $T_{AP}$ and $T_{last\_AP}$, and $T_{diff\_controller}$ is a difference between $T_{controller}$ and $T_{last\_controller}$;

$T_{AP}$ is a current AP system time obtained from the first system clock of the AP in a second time synchronize procedure;

$T_{last\_AP}$ is a last AP system time recorded by the AP in a first time synchronize procedure during which the AP recorded $T_{last\_controller}$ as $T_{last\_AP}$, wherein the first time synchronize procedure is prior to the second time synchronize procedure;

$T_{controller}$ is a last controller system time obtained from the second system clock of the controller in the second time synchronize procedure; and $T_{last\_controller}$ is the last controller system time obtained from the second system clock of the controller in the first time synchronize procedure.

2. The device of claim 1, wherein the first time synchronize procedure and the second time synchronize procedure are adjacent time synchronize procedures between the AP and the controller.

3. The device of claim 2, wherein during at least one of the first time synchronize procedure and the second time synchronize procedure, a time synchronize request message is sent to the controller, and a time synchronize respond message is received from the controller.

4. The device of claim 3, wherein before sending the time synchronize request message, a Hello Request message is sent to the controller, and a Hello Respond: OK message corresponding to the Hello Request message is received from the controller.

5. The device of claim 1, wherein if the time difference is less than the pre-determined time difference threshold, the first system clock of the AP is not abnormal.

6. The device of claim 1, wherein the memory storing instructions further comprise an instruction that, when executed by the at least one processor, cause the device to, in response to determining the first system clock of the AP is abnormal, report the first system clock of the AP to the controller.

7. A method comprising:

detecting, by a processor of an access point (AP), a time difference between a first system clock of the AP and a second system clock of a controller;

determining, by the processor, that the first system clock of the AP is abnormal when the time difference is greater than or equal to a pre-determined time difference threshold; and in response to determining that the first system clock of the AP is abnormal, recovering the first system clock of the AP by rebooting the AP, wherein the time difference between the first system clock of the AP and the second system clock of the controller is an absolute value of a difference between $T_{diff\_AP}$ and $T_{diff\_controller}$, wherein:

$T_{diff\_AP}$ is a difference between $T_{AP}$ and $T_{last\_AP}$, and $T_{diff\_controller}$ is a difference between $T_{controller}$ and $T_{last\_controller}$;

$T_{AP}$ is a current AP system time obtained from the first system clock of the AP in a second time synchronize procedure;

$T_{last\_AP}$ is a last AP system time recorded by the AP in a first time synchronize procedure during which the AP recorded $T_{last\_controller}$ as $T_{last\_AP}$, wherein the first time synchronize procedure is prior to the second time synchronize procedure;

$T_{controller}$ is a last controller system time obtained from the second system clock of the controller in the second time synchronize procedure; and $T_{last\_controller}$ is the last controller system time obtained from the second system clock of the controller in the first time synchronize procedure.

8. The method of claim 7, wherein the first time synchronize procedure and the second time synchronize procedure are adjacent time synchronize procedures between the AP and the controller.

9. The method of claim 8, wherein during at least one of the first time synchronize procedure and the second time synchronize procedure, a time synchronize request message is sent to the controller, and a time synchronize respond message is received from the controller.

10. The method of claim 7, further comprising:

in response to determining the first system clock of the AP is abnormal, reporting, by the processor, the first system clock of the AP to the controller.

11. A non-transitory computer readable storage medium storing instructions that, when executed by a processor of an access point (AP), causes the processor to:

detect a time difference between a first system clock of an access point (AP) and a second system clock of a controller;

determine that the first system clock of the AP is abnormal when the time difference is greater than or equal to a pre-determined time difference threshold; and in response to determining that the first system clock of the AP is abnormal, recover the first system clock of the AP by rebooting the AP, wherein the time difference between the first system clock of the AP and the second system clock of the controller is an absolute value of a difference between $T_{diff\_AP}$ and $T_{diff\_controller}$, wherein:

$T_{diff\_AP}$ is a difference between $T_{AP}$ and $T_{last\_AP}$, and $T_{diff\_controller}$ is a difference between $T_{controller}$ and $T_{last\_controller}$;

$T_{AP}$ is a current AP system time obtained from the first system clock of the AP in a second time synchronize procedure;

$T_{last\_AP}$ is a last AP system time recorded by the AP in a first time synchronize procedure during which the AP recorded $T_{last\_controller}$ as $T_{last\_AP}$, wherein the first time synchronize procedure is prior to the second time synchronize procedure;

$T_{controller}$ is a last controller system time obtained from the second system clock of the controller in the second time synchronize procedure; and $T_{last\_controller}$ is the last controller system time obtained from the second system clock of the controller in the first time synchronize procedure.

12. The non-transitory computer readable storage medium of claim 11, further storing instructions that, when executed by the processor, causes the processor to:

in response to determining the first system clock of the AP is abnormal, report the first system clock of the AP to the controller.

* * * * *